United States Patent
Marple et al.

(10) Patent No.: US 10,823,934 B2
(45) Date of Patent: Nov. 3, 2020

(54) SPECTROMETERS HAVING A VARIABLE FOCUS LENS WITH A SINGLE AIR GAP

(71) Applicants: Eric Todd Marple, Loxahatchee, FL (US); Kirk David Urmey, West Milton, OH (US); John Meckert, Houston, TX (US)

(72) Inventors: Eric Todd Marple, Loxahatchee, FL (US); Kirk David Urmey, West Milton, OH (US); John Meckert, Houston, TX (US)

( * ) Notice: Subject to any disclaimer, the term of this patent is extended or adjusted under 35 U.S.C. 154(b) by 33 days.

(21) Appl. No.: 16/579,246

(22) Filed: Sep. 23, 2019

(65) Prior Publication Data

US 2020/0057243 A1 Feb. 20, 2020

Related U.S. Application Data

(62) Division of application No. 16/105,568, filed on Aug. 20, 2018, now Pat. No. 10,459,191.

(51) Int. Cl.

| | |
|---|---|
| *G01J 3/28* | (2006.01) |
| *G02B 7/10* | (2006.01) |
| *G02B 5/32* | (2006.01) |
| *G02B 5/18* | (2006.01) |
| *G03H 1/02* | (2006.01) |
| *G02B 7/02* | (2006.01) |
| *G01J 3/02* | (2006.01) |
| *G01J 3/18* | (2006.01) |
| *G02B 27/30* | (2006.01) |
| *G01J 3/44* | (2006.01) |

(52) U.S. Cl.
CPC .............. *G02B 7/10* (2013.01); *G01J 3/0208* (2013.01); *G01J 3/1838* (2013.01); *G02B 5/1866* (2013.01); *G02B 5/32* (2013.01); *G02B 7/021* (2013.01); *G02B 27/30* (2013.01); *G03H 1/0248* (2013.01); *G01J 3/44* (2013.01); *G03H 2240/11* (2013.01)

(58) Field of Classification Search
CPC .......... G02B 7/10; G02B 27/30; G02B 7/021; G02B 13/00; G02B 15/00; G01J 3/0208; G01J 3/26; G01J 3/28
See application file for complete search history.

(56) References Cited

U.S. PATENT DOCUMENTS

| | | | |
|---|---|---|---|
| 2014/0176729 A1* | 6/2014 | Saari | G01J 3/45 348/182 |
| 2014/0285905 A1* | 9/2014 | Zhou | G03B 5/02 359/696 |
| 2017/0273564 A1* | 9/2017 | Banke | A61B 5/7221 |

\* cited by examiner

*Primary Examiner* — Abdullahi Nur
(74) *Attorney, Agent, or Firm* — Ingram IP Law, P.A.

(57) ABSTRACT

The technology provides two or more spectrometers with substantially uniform focal lengths. A method includes adjusting a size of a first air gap associated with a first lens in order to modify a first focal length and securing a relative position of a first body and a second body of the first lens to set the first focal length at a first value for a first spectrometer. The method further includes adjusting a size of a second air gap associated with a second lens provided in a second spectrometer in order to modify a second focal length and securing a relative position of a first body and a second body of the second lens to set the second focal length at a second value for a second spectrometer. The first and second values are selected to render the first focal length substantially equal to the second focal length.

30 Claims, 10 Drawing Sheets

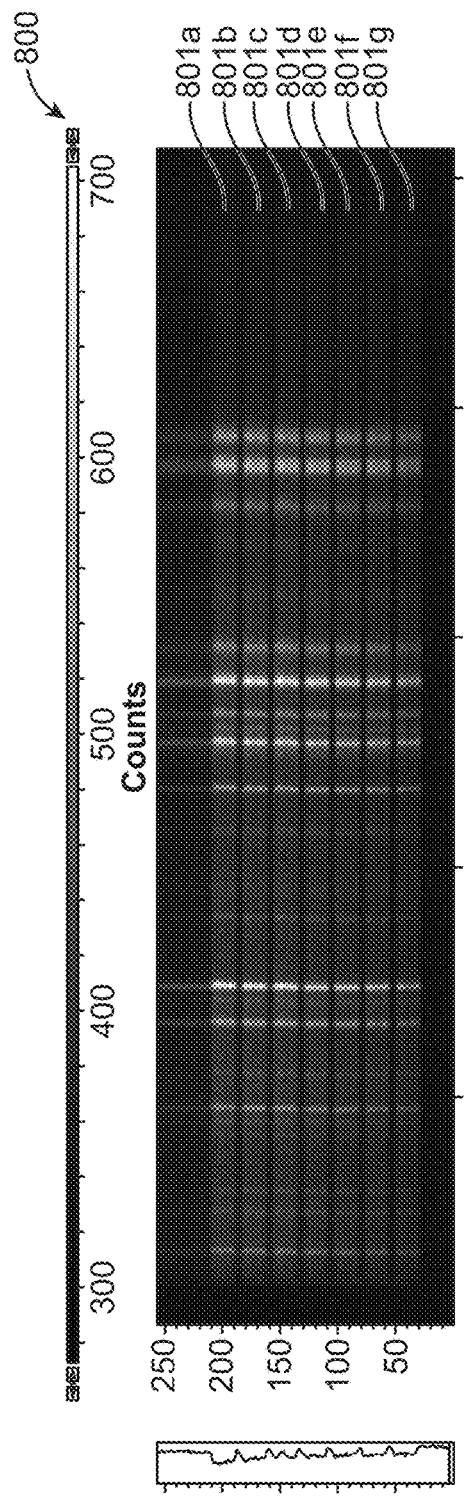
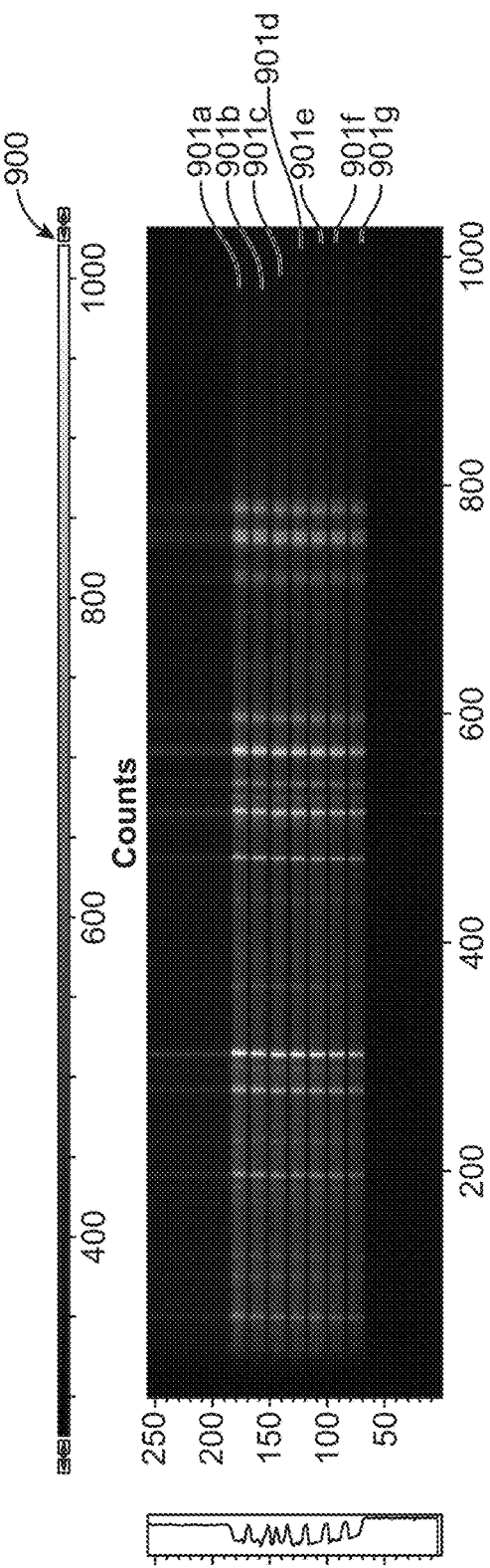
FIG. 8
FIG. 9

SPECTROMETERS HAVING A VARIABLE FOCUS LENS WITH A SINGLE AIR GAP

CROSS REFERENCE TO RELATED APPLICATIONS

This application claims priority to U.S. patent application Ser. No. 16/105,568 filed on Aug. 20, 2018, the complete disclosure of which is incorporated herein by reference in its entirety.

FIELD OF THE TECHNOLOGY

This technology broadly relates to spectrometers, more specifically to spectrometers having a variable focus lens, and still more specifically to spectrometers having a variable focus lens with a single air gap.

BACKGROUND OF THE TECHNOLOGY

Various types of spectroscopy may be employed for optical tissue diagnostics including auto-fluorescence, exogenous-drug fluorescence, Raman, elastic scattering, absorption and Fourier-transform infrared (FTIR). Spectroscopy involves illuminating a substance such as a tissue sample with light rays. The light rays scatter at various angles relative to an angle of the incident source and the scattered light rays are captured and analyzed using a spectrometer. The scattering events may cause elastic or inelastic photon-matter interactions. An inelastic photon-matter interaction changes a photon's energy or wavelength, while an elastic photon-matter interaction does not change a photon's energy or wavelength. Furthermore, a fraction of photons may be absorbed by the substance during spectroscopy.

Raman spectroscopy, diffuse reflectance spectroscopy, and fluorescence spectroscopy may be used to detect vibrational and nonvibrational photonic responses of a substance. Diffuse reflectance spectroscopy is used to chemically analyze a substance and to measure surface features by visual perception. Diffuse reflectance involves elastic scattering of light rays from a substance at diffuse angles relative to the incident beam. For example, the surface of a projector screen diffusely reflects light.

Fluorescence spectroscopy may be used to chemically analyze a substance. A substance exhibits fluorescence if it absorbs light rays at one wavelength and emits light rays at a longer wavelength due to electronic transitions. For example, a highlighter felt-tip marker appears to glow green as it absorbs blue and ultraviolet light in order to emit green light.

Raman spectroscopy involves illuminating a substance or sample using a high-power, narrow-wavelength energy source such as a monochromatic or laser light. The Raman light is collected by a spectrometer to chemically analyze and monitor characteristics of the substance. The Raman effect causes the light to scatter in random directions to produce an inelastic scattering of photons. The photons emitted by the laser produce wavelength shifts that induce low intensity light emissions from the sample. The Raman-scattered light is color shifted relative to an incident laser beam. The color frequency shifts are highly specific to the substance and correspond to molecular bond vibrations that induce molecular polarizability changes. The colors identified by spectral positions of the shifts correspond to chemical compositions of the substance, while the spectral peak height or intensity of the shifts correlate to chemical concentrations of the substance. Thus, Raman spectroscopy may be used for chemical identification and provides an inference of chemical content and concentration.

A Raman spectrometer may employ a probe with optical fibers that guide laser light therethrough to illuminate a substance and collect Raman light emitted from the substance. The collected Raman light is a low intensity light that is passed through components of the spectrometer including a collimating lens, a filter, a grating, a focus lens, and a CCD camera. The collected Raman light includes color frequency shifts that correspond to chemical compositions of the substance. The focal length of the focus lens defines a length or width the Raman spectrum will spread in the x-direction on the CCD camera.

The Raman spectrum is produced when light having one wavelength interacts with molecules of a substance and scatters into light having a different wavelength or wavelengths. Through a quantized exchange of energy, the molecules absorb exciting radiation from light having one wavelength and emit radiation having a different wavelength or wavelengths. The energy of the emitted light is different than the energy of the exciting light. For example, the energy of the emitted light may increase or decrease by amounts that correspond to certain differences in the energy levels that are characteristic of the molecule of the substance being irradiated. Furthermore, the Raman response may emit radiation having one or more wavelengths. Raman scattering produces a spectrum that is characteristic of molecules of the substance based on differences in the frequencies of the various Raman lines on the Raman spectrum as compared to the frequencies of the exciting radiation. Since molecules of a substance have quantized energy levels, the frequency differences have a series of discrete values that characterize the different Raman lines or bands. The positions of Raman lines on the Raman spectrum for a substance varies based on a frequency of the exciting radiation. In other words, Raman lines do not have fixed position or frequency on the Raman spectrum and may shift based on characteristics of the exciting radiation.

Currently, mathematical algorithms may be employed to align Raman lines on the Raman spectrum for applications that require a comparison of test results obtained from two or more spectrometers. However, drawbacks exist with using mathematical algorithms for this purpose.

BRIEF DESCRIPTION OF THE FIGURES

FIG. 8 illustrates a CCD image of a spectrum for a 7-fiber probe utilizing a 50 mm focal length collimating lens according to one example of the technology;

FIG. 9 illustrates a CCD image of a spectrum for a 7-fiber probe utilizing a 72 mm focal length collimating lens according to one example of the technology.

DETAILED DESCRIPTION OF THE TECHNOLOGY

Figure 1:
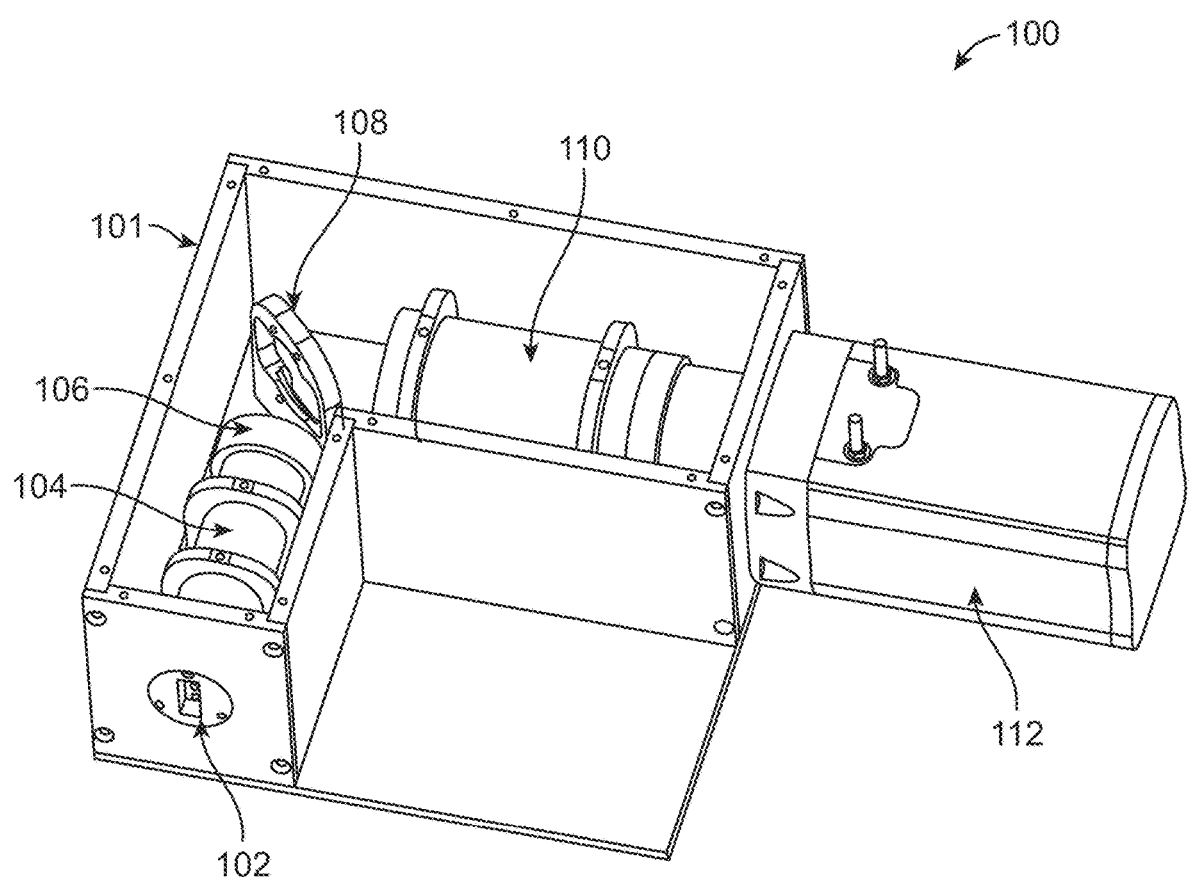
FIG. 1 illustrates a spectrometer according to one example of the technology.

It will be appreciated that for simplicity and clarity of illustration, where appropriate, reference numerals may be repeated among the different figures to indicate corresponding or analogous elements. In addition, numerous specific details are set forth in order to provide a thorough understanding of the examples described herein. However, it will be understood by those of ordinary skill in the art that the examples described herein may be practiced without these specific details. In other instances, methods, procedures, and components have not been described in detail so as not to obscure the related relevant feature being described. Also, the description is not to be considered as limiting the scope of the examples described herein. The drawings are not necessarily to scale and the proportions of certain parts may have been exaggerated to better illustrate details and features of the present disclosure. Those skilled in the art with access to the teachings provided herein will recognize additional modifications, applications, and examples within the scope thereof and additional fields in which the technology would be of significant utility.

Unless defined otherwise, technical terms used herein have the same meaning as is commonly understood by one of ordinary skill in the art to which this disclosure belongs. The terms "first," "second," and the like, as used herein do not denote any order, quantity, or importance, but rather are used to distinguish one element from another. Also, the terms "a" and "an" do not denote a limitation of quantity, but rather denote the presence of at least one of the referenced items. The term "or" is meant to be inclusive and means either, any, several, or all of the listed items. The terms "comprising," "including," and "having" are used interchangeably in this disclosure. The terms "comprising," "including," and "having" mean to include, but are not necessarily limited to the things so described.

The terms "connected" and "coupled" can be such that the objects are permanently connected or releasably connected. The term "substantially" is defined to be essentially conforming to the thing that it "substantially" modifies, such that the thing need not be exact. For example, substantially 2 inches (2") means that the dimension may include a slight variation.

The terms "circuit," "circuitry," and "controller" may include either a single component or a plurality of components, which are either active and/or passive components and may be optionally connected or otherwise coupled together to provide the described function. The "processor" described in any of the various embodiments includes an electronic circuit that can make determinations based upon inputs and is interchangeable with the term "controller." The processor can include a microprocessor, a microcontroller, and a central processing unit, among others, of a general-purpose computer, special purpose computer, ASIC, or other programmable data processing apparatus. While a single processor may be used, the present disclosure can be implemented over a plurality of processors.

The "server" described in any of the various embodiments includes hardware and/or software that provides processing, database, and communication facilities. By way of example, and not limitation, "server" may refer to a single, physical processor with associated communications and data storage and database facilities, or it can refer to a networked or clustered complex of processors and associated network and storage devices, as well as operating software and one or more database systems and applications software that support the services provided by the server.

The technology described herein applies to spectrometers and to techniques for providing two or more spectrometers that have uniform focal lengths in order to facilitate comparing spectral results obtained from the two or more spectrometers. According to one example, the technology allows the focal lengths of two or more spectrometers to be made uniform relative to each other in order to remove spectral variations when comparing results obtained from two spectrometers. Prior to this technology, the spectrometer industry compensated for spectral variations obtained from two or more spectrometers by using mathematical algorithms to shift spectrum frequencies to known peak values. This conventional technique is labor intensive and does not provide uniform results when used with multiple spectrometers. For example, even if peak values are aligned for select frequencies, conventional techniques suffer from deficiencies such as generating peaks having different widths and shapes for two or more spectrometers. Conventional techniques suffer from other deficiencies.

According to one example, the technology described herein may be used in the medical field where research studies may be improved by sharing spectral results obtained from two or more spectrometers. According to one example, the two or more spectrometers may be located at different medical facilities. For example, the medical facilities may be located in different cities, states, countries, or the like. According to one example, spectrometers may be provided at multiple medical facilities to obtain test results for a particular research study. For example, Raman spectra may be obtained from substantially similar spectrometers located at medical facilities in Europe and the United States ("U.S."). According to one example, the substantially similar spectrometers may have substantially similar features such as substantially similar focal lengths, slit widths, excitation laser wavelengths, and the like. According to one example, the Raman spectra may be obtained during medical procedures performed to identify tissue types such as healthy tissue and diseased tissue. According to one example, the spectral results obtained from the various spectrometers may be electronically transmitted to a database for storage.

According to one example, the technology described herein provides two or more spectrometers with spectrometer optics that may be adjusted to a substantially same focal length. Spectral results are highly influenced by spectrometer characteristics, probe characteristics, and detector characteristics, among other system characteristics. For example, the positions of Raman lines on the Raman spectrum may be determined by spectrometer characteristics such as a frequency of the exciting radiation and by spectrometer optics. According to one example, spectrometer optical characteristics may cause the Raman lines to change or shift in position. For example, the frequencies of the Raman line peaks may shift due to optical lens characteristics. Additionally, a profile or shape of the Raman lines such as peak width and/or peak height may vary based on optical lens characteristics.

According to one example, the profiles or shapes of the Raman lines may differ when obtained from spectrometers having different optical lens characteristics. For example, two spectrometers with slightly different optical lens characteristics that are used to test a same substance may produce Raman spectra having Raman lines with slightly different shapes or positions. For example, the Raman lines on the Raman spectra may be shifted or may peak at slightly different frequencies, may have slightly different heights, or may have slightly different peak widths, among other slight differences. According to one example, slight variations in Raman spectra obtained from two spectrometers that are used to test a same specimen occur because the spectrometers have different optical lens characteristics, for example. These variations in Raman spectra may occur despite employing best efforts to manufacture spectrometers with optical lenses having substantially identical optical characteristics.

According to one example, these variations in Raman spectra may occur even for spectrometers that are built using lenses that originate from a same manufacturing facility. For example, two lenses created according to the same design specifications and produced using the same manufacturing tools may have focal lengths that vary by ±2%. According to one example, these focal length variations may result from differences in a composition of materials used to manufacture the lenses; a drift in environmental conditions that occurs at a manufacturing facility while the lenses are being manufactured such as tooling wear due to standard use, temperature drifts, humidity drifts, or the like; and a varying orientation of starter materials within a cutting tool, where starter materials are materials used to make lenses; among other differences. Since focal length variations may be attributed to factors outside the control of lens manufacturers, the lens and spectrometer industries may consider focal length variations of around ±2% to be within an acceptable tolerance. If customers desire tighter tolerances for a batch of lenses, then lens manufacturers may be required to test and hand pick specific lenses following production. However, the cost to produce lenses under tighter tolerances may add substantial cost to lenses. One of ordinary skill in the art will readily appreciate that it is nearly impossible to mass produce optical lenses having substantially identical characteristics.

According to one example, focal length variations may remain at ±1% even for lenses selected under tight tolerances. Employing these lenses in spectrometers may produce instruments having slightly different focal lengths relative to each other. It follows that Raman spectra obtained from two spectrometers that are used to test a same or substantially similar substance will include Raman line profiles having peaks that vary slightly in position and shape relative to each other. It is worth noting that spectrometers manufactured using lenses with focal length variations of ±2% or more remain acceptable for standalone applications. In other words, spectral results obtained from a same spectrometer will include Raman line profiles having peaks with the same variations in position and shape from sample to sample. These same variations embedded over multiple spectral results will not be detected since they are consistent when produced by a same spectrometer.

Returning to the example of comparing Raman spectra obtained from two or more spectrometers that are manufactured with lenses having focal length variations of around ±2%, each spectrometer will generate different Raman spectra when used to test a same or substantially similar substance. According to one example, corrections may be applied to manipulate the Raman spectra after the two or more spectrometers generate the Raman spectra. According to one example, the corrections may be applied to remove or minimize differences in the Raman spectra generated by two or more spectrometers. These differences may be caused by different focal lengths associated with the focal lenses provided in each of the two or more spectrometers. For example, corrections may be made using mathematical algorithms that manipulate the Raman spectrum to align positions, heights, widths, or shapes of the Raman lines produced by two or more spectrometers. However, correcting Raman spectra after the spectrometers generate the Raman spectra is tedious and may introduce errors. For example, the errors may include applying incorrect assumptions into the mathematical algorithms, among other errors.

According to one example, the technology provides an adjustable focal lens structure for each spectrometer. The focal lens structure allows adjustment or correction of focal lengths between two or more spectrometers to generate substantially similar Raman spectra when testing a same or substantially similar substance. According to one example, the adjustment or correction of the focal lengths is performed before the spectrometers generate the Raman spectra. In this way, the adjustable focal lens structure enables construction of two or more spectrometers with substantially the same focal length in order to generate substantially similar Raman spectra when testing a same or substantially similar substance. Accordingly, the technology performs corrections prior to generating an image. In contrast, conventional systems perform corrections after generating an image.

According to one example, spectrometer optics may include a collimating lens and a focus lens, or the like. According to one example, the spectrometer optics may include a variable focal lens structure for the collimating lens and the focus lens. For example, the variable focal lens structure may include a body that telescopes or is otherwise adjustable to vary a focal length of the spectrometer optics. According to one example, the body may telescope to adjust an air gap provided between lenses. For example, the air gap may be increased to increase a focal length of the spectrometer optics. Alternatively, the air gap may be decreased to decrease a focal length of the spectrometer optics.

As will be described further below, the focus lens may include a first adjustable body configured to displace one or more lenses to provide a variable focal length. According to one example, lenses provided within the first adjustable body may be displaced to stretch or compress a spectral response that is projected onto the detector. For example, the lenses provided within the first adjustable body may be displaced to change an amount the spectral response is stretched or compressed in an x-dimension before being projected onto the detector. Accordingly, lenses provided within the first adjustable body may be displaced to maximize a width the spectral response is projected onto the detector while remaining within boundaries of the detector.

Additionally, the collimating lens may include a second adjustable body having lenses that are displaced to provide a variable focal length. According to one example, lenses provided within the second adjustable body may be displaced to change a height the spectral response is projected onto the detector. For example, lenses provided within the second adjustable body may be displaced to change a height of the spectral response in a y-dimension before being projected onto the detector. Accordingly, the lenses provided within the second adjustable body may be displaced to maximize a height the spectral response is projected onto the detector while remaining within boundaries of the detector. One of ordinary skill in the art will readily appreciate that adjusting a focal length of the collimating lens may not change an amount the spectral response is stretched or compressed in the x-dimension.

FIG. 1 illustrates a spectrometer 100 according to one example of the technology. The spectrometer 100 may include a housing 101, a slit 102, a collimating lens 104, a filter 106, a grating 108, a focus lens 110, and a detector 112. According to one example, the slit 102 is housed in an input connector that couples a probe 1002 (see FIG. 11) to the spectrometer 100. The slit 102 includes a width dimension that determines a resulting resolution of the spectrometer 100. Accordingly, the slit may be dimensioned to define a resolution for the spectrometer. The probe 1002 includes optical fibers that guide collected Raman light to the spectrometer 100 for analysis. According to one example, the collected Raman light passes through the slit 102 and may be projected onto the collimating lens 104 where the light is collimated prior to entering the filter 106. The filter 106 may be a laser blocking filter 106 that removes any residual laser light. The collected Raman light passing through the filter 106 may impinge upon a transmission grating 108 that frequency separates the light and directs it into the focus lens 110. According to one example, the transmission grating 108 may include a volume phase holographic transmission grating that diffracts different wavelengths of light from a common input path into different angular output paths. According to one example, the volume phase holographic transmission grating 108 may be formed of a transmissive material that modulates the refractive index with a phase of the collected Raman light as it passes through the optically thick film. One of ordinary skill in the art will readily appreciate that other types of transmission gratings may be used. Furthermore, one of ordinary skill in the art will readily appreciate that while the technology is described in the environment of a Raman spectrometer herein, the technology described herein may be used with other types of spectrometers.

According to one example, the Raman collected light passing through the grating 108 may be introduced into the focus lens 110 before being projected onto the detector 112. According to one example, the detector 112 may generate an analog signal that is converted to a digital signal using an A/D converter. The digital signal may be displayed on a graphical user interface as a Raman spectrum that corresponds to characteristics of a substance being tested.

Figure 2:
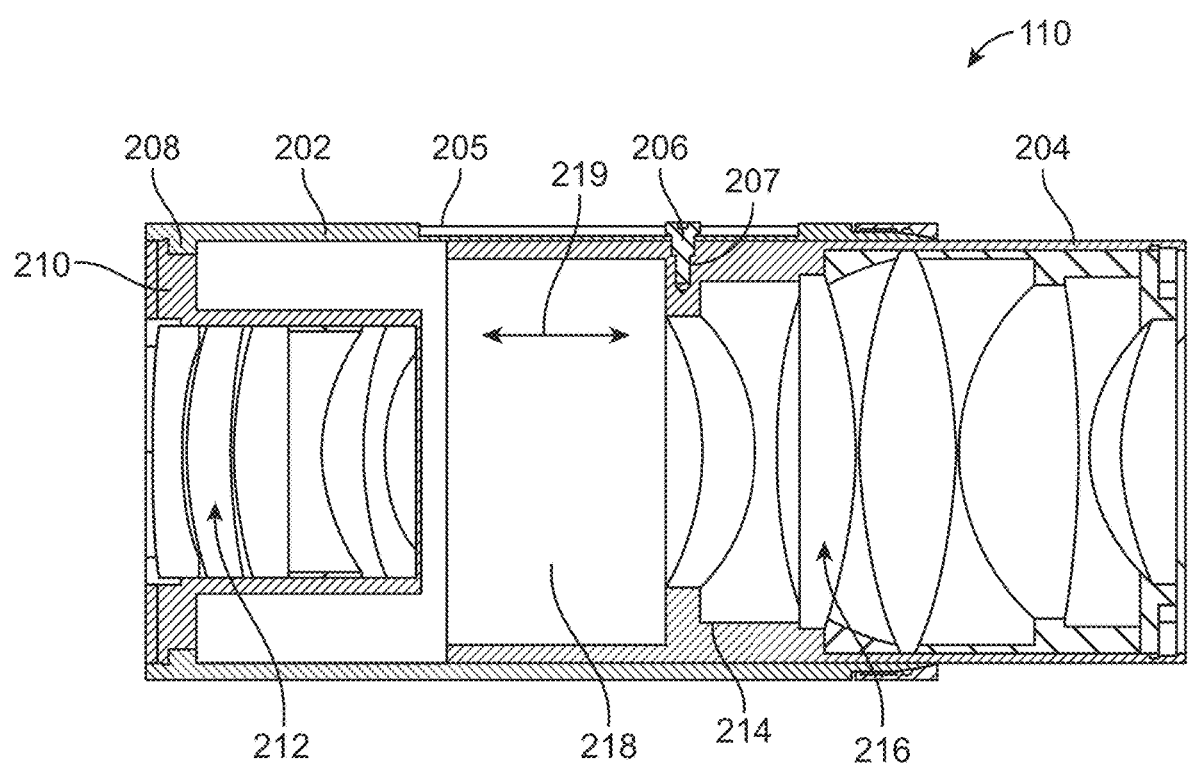
FIG. 2 illustrates a focus lens provided in an extended position according to one example of the technology.

FIG. 2 illustrates the focus lens 110 according to one example of the technology. According to one example, the focus lens 110 may include a telescoping structure that includes an outer body 202 and an inner body 204. According to one example, the outer body 202 may be dimensioned to receive the inner body 204 therein. For example, an inside diameter of the outer body 202 may be dimensioned to receive an outside diameter of the inner body 204. According to one example, the inside diameter of the outer body 202 may be slightly larger than the outside diameter of the inner body 204 to provide a tight fit while allowing the inner body 204 to slide or telescope within the outer body 202. According to one example, the bodies 202, 204 may be dimensioned to fit sufficiently tight relative to each other while preventing flexing in an x-direction, y-direction, or z-direction. Furthermore, the outer body 202 and the inner body 204 may be substantially concentric when the inner body 204 is inserted into the outer body 202. The concentric aspect may facilitate aligning lenses provided within the outer body 202 and the inner body 204. One of ordinary skill in the art will readily appreciate that the outer body 202 and the inner body 204 may have other cross-sectional shapes such as rectangular, octagonal, or the like.

According to one example, a fastener 206 may be provided to fixedly secure the outer body 202 and the inner body 204. For example, the fastener 206 may fixedly secure the outer body 202 relative to the inner body 204. According to one example, the fastener 206 may include a screw, a pin, or the like. According to one example, the outer body 202 may include an elongated slot 205 and the inner body 204 may include a cavity 207. According to one example, the fastener 206 may be inserted into the cavity 207 provided in the inner body 204. According to one example, the cavity 207 may include threads for securing a screwing fastener. According to one example, the inner body 204 may slide into the outer body 202 and may be restricted to slide an amount that corresponds to a length of the elongated slot 205 provided in the outer body 202. Accordingly, an overall length of the focus lens 110 varies as the inner body 204 slides into and out of the outer body 202.

According to one example, the fastener 206 may be fixedly secured or tightened to prevent the outer body 202 and the inner body 204 from sliding relative to each other. For example, the fastener 206 may be tightened after a desired focal length is achieved to lock a relative position of the outer body 202 and the inner body 204. For example, the fastener 206 may be a screwing fastener that is tightened into the cavity 207 to frictionally secure the outer body 202 and the inner body 204. According to one example, the fastener 206 may be removed or loosened to allow the outer body 202 and the inner body 204 to slide relative to each other. Generally, the focal length of the focus lens 110 is maintained after being set and is not adjusted after a spectrometer is shipped from a manufacturer. However, there may be circumstances where it is desirable to provide uniform focal lengths to a group of spectrometers after they are shipped from a manufacturer. In this case, a qualified operator may adjust the focal lengths of a group of spectrometers selected for a specific study. In either case, the focal lengths of the group of spectrometers may remain fixed while the spectrometers are in use. One of ordinary skill in the art will readily appreciate that the fastener may include epoxy, a rivet, or other fastener that provides one-time use. According to one example, the telescoping structure may include additional fastening mechanisms that secure the outer body 202 and the inner body 204. For example, the outer body 202 may include a fastening mechanism on an end that receives the inner body 204. The fastening mechanism may include a clamp with a screw that clamps the end of the outer body 202 to the inner body 204. One of ordinary skill in the art will readily appreciate that other fastening mechanisms may be used.

According to one example, the outer body 202 and the inner body 204 may be configured to receive one or more lenses. For example, an inside surface of the outer body 202 may include a protrusion 208 that is dimensioned to secure a lens structure 210. According to one example, the lens structure 210 may define a cavity that receives one or more lenses therein to form a first lens set 212. According to one example, an inside surface of the inner body 204 may define a cavity 214 that is dimensioned to secure one or more lenses thereto. According to one example, one or more lenses may be secured within the cavity 214 to form a second lens set 216. One of ordinary skill in the art will readily appreciate that the lenses may be directly secured to the outer body 202 or the inner body 204. Alternatively, the lenses may be indirectly secured to the outer body 202 or the inner body 204 using a separate structure. One of ordinary skill in the art will readily appreciate that several lens designs may be employed to obtain desired properties such as focal length, wavelength, distortion, chromatic aberration, or the like. Furthermore, the desired properties may determine a number of individual lenses employed, a glass type, diameters and thicknesses of lenses, curvature of the individual lenses, placement of fixed air gaps between the individual lenses, achromats or cemented groups, anti-reflective coatings for the individual lenses or groups of lenses, or the like.

Figure 3:
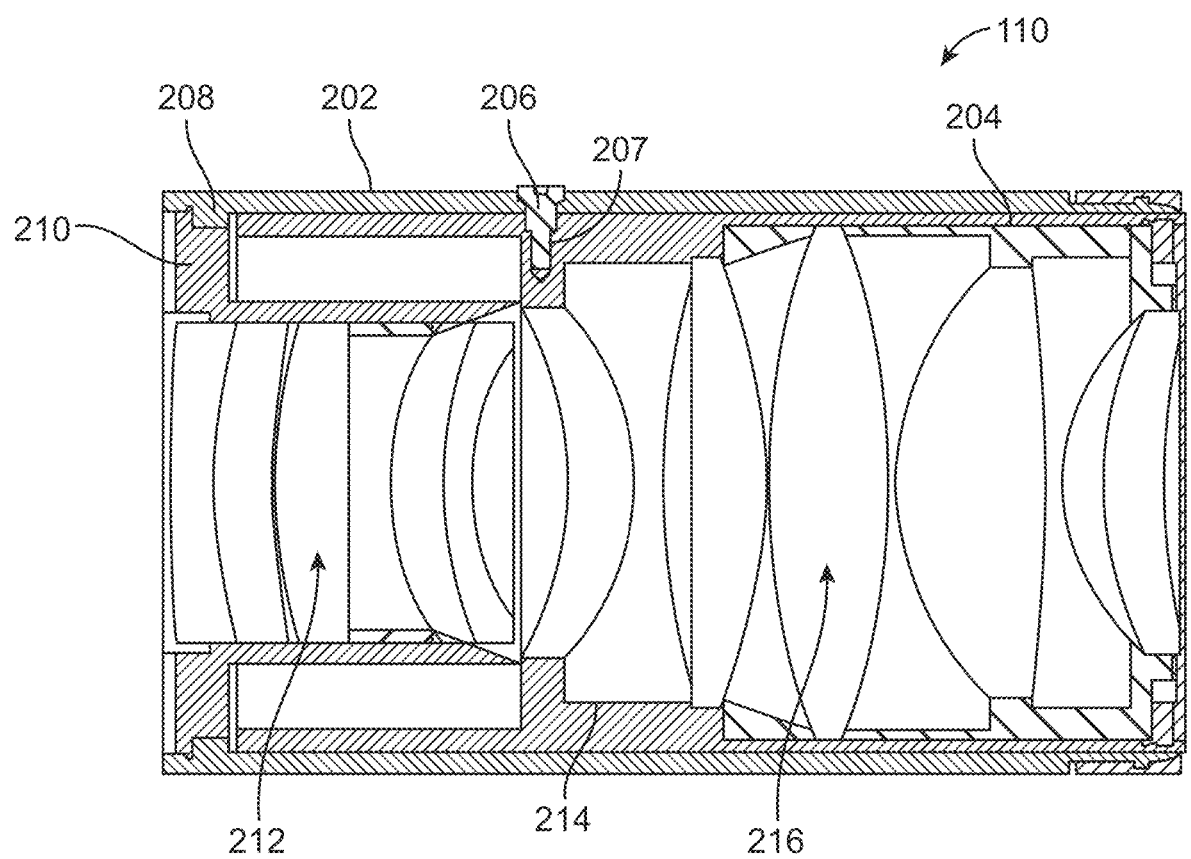
FIG. 3 illustrates a focus lens provided in a retracted position according to one example of the technology.

FIG. 2 illustrates an adjustable single air gap 218 defined between the first lens set 212 and the second lens set 216. According to one example, an arrow 219 is illustrated within the adjustable air gap 218 to indicate a direction the inner body 204 may move or slide relative to the outer body 202. According to one example, a dimension of the air gap 218 may be adjusted by sliding the inner body 204 relative to the outer body 202. With reference to FIG. 3, the focus lens 110 is illustrated with the inner body 204 inserted into the outer body 202 to eliminate the air gap 218. With reference to FIGS. 2 and 3, the overall length of the focus lens 110 is longer in FIG. 2 when the single air gap 218 is present and shorter in FIG. 3 when the single air gap 218 is eliminated. According to one example, the focus lens 110 may have a focal length that varies in a range of 70-100 mm. One of ordinary skill in the art will readily appreciate that the focus lens may have a focal length that varies over a different range.

Figure 4:
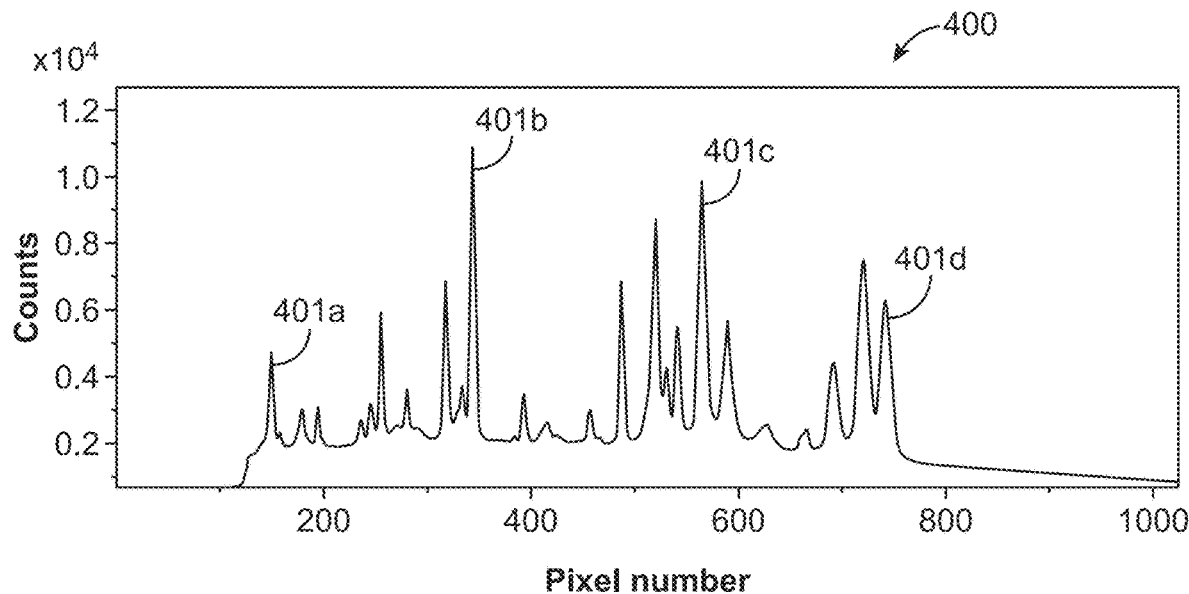
FIG. 4 illustrates a Raman spectrum for a 75 mm focal length focus lens according to one example of the technology.
Figure 5:
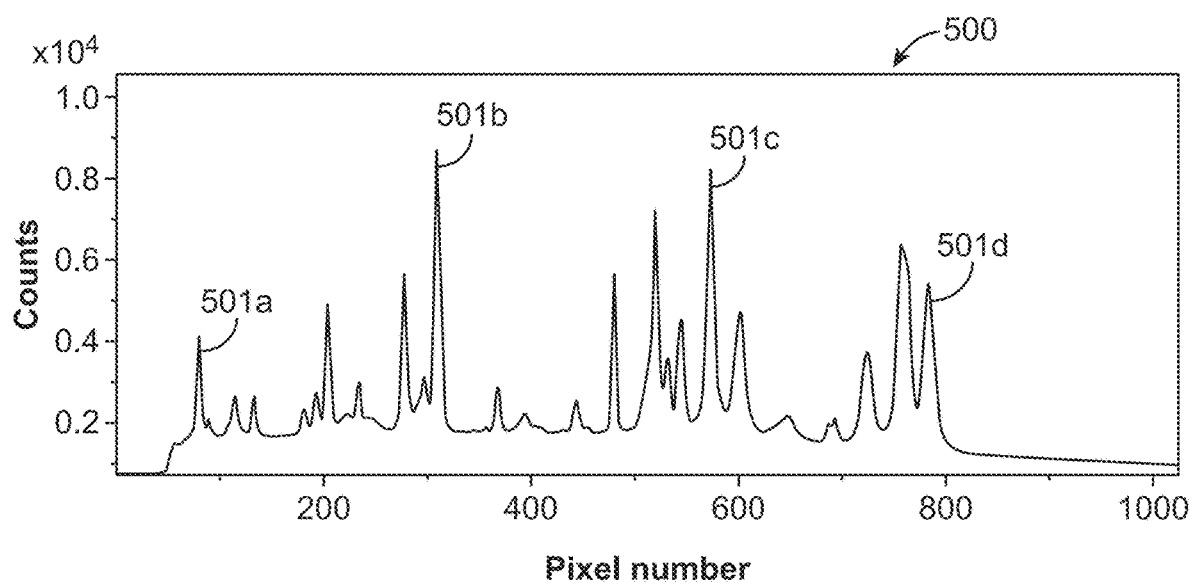
FIG. 5 illustrates a Raman spectrum for an 88 mm focal length focus lens according to one example of the technology.

FIG. 4 illustrates a Raman spectrum 400 for a focus lens 110 having a first focal length and FIG. 5 illustrates a Raman spectrum 500 for a focus lens 110 having a second focal length, where the first focal length is shorter than the second focal length. For example, the first focal length may be 75 mm and the second focal length may be 88 mm. According to one example, the Raman spectra 400,500 are obtained using a same spectrometer that is used to test a same substance. Generally, Raman spectra 400,500 have a similar profile and include a same number of Raman lines. On closer inspection, Raman spectra 400 obtained using the focus lens 110 having a 75 mm focal length generates Raman lines with different shapes and positions compared to the Raman spectra 500 obtained using the focus lens 110 having an 88 mm focal length. For example, the Raman lines on the Raman spectra 400 are shifted relative to the Raman lines on the Raman spectra 500. To highlight the Raman line shifts, selected Raman lines are marked 401a-401d on Raman spectra 400 and corresponding Raman lines are marked 501a-501d on Raman spectra 500.

Referring to FIG. 4, Raman line 401a is positioned at approximately pixel number 150, Raman line 401b is positioned at approximately pixel number 350, Raman line 401c is positioned at approximately pixel number 575, and Raman line 401d is positioned at approximately pixel number 750. Referring to FIG. 5, Raman line 501a is positioned at approximately pixel number 75, Raman line 501b is positioned at approximately pixel number 300, Raman line 501c is positioned at approximately pixel number 585, and Raman line 501d is positioned at approximately pixel number 800. According to one example, the shift in corresponding Raman lines on Raman spectra 400,500 is due to the change in focal length of the focal lens 110. A comparison of the corresponding Raman lines on Raman spectra 400, 500 further demonstrates different heights and different peak widths, among other differences.

Figure 6:
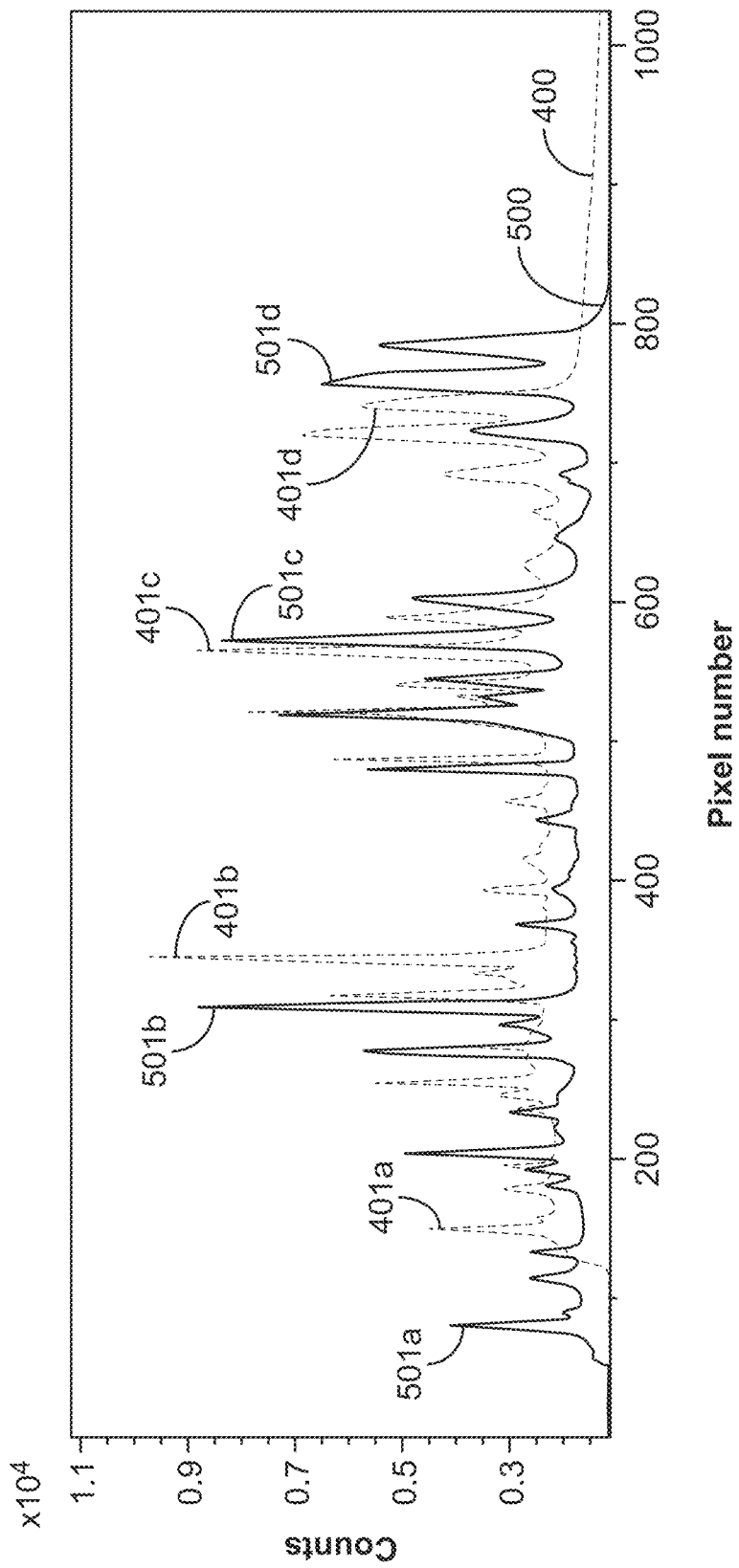
FIG. 6 illustrates an overlay of the Raman spectra illustrated in FIGS. 4 and 5 according to one example of the technology.

According to one example, FIG. 6 illustrates an overlay of the Raman spectra 400,500 demonstrating the shift in corresponding Raman lines. The Raman spectrum 400 corresponds to the first focal length of 75 mm and the Raman spectrum 500 corresponds to the second focal length of 88 mm. According to one example, the Raman spectrum 400 associated with the 75 mm focal length is compressed in the x-direction compared to the Raman spectrum 500 associated with the 88 mm focal length. Stated differently, the Raman spectrum 500 associated with the 88 mm focal length is stretched in the x-direction compared to the Raman spectrum 400 associated with the 75 mm focal length. According to one example, the Raman lines 401a,b are shifted to a higher pixel number as compared to the Raman lines 501a,b. According to one example, the Raman line 401c is slightly shifted as compared to the Raman lines 501c. According to one example, the Raman line 401d is shifted to a lower pixel number as compared to the Raman line 501d.

Figure 7:
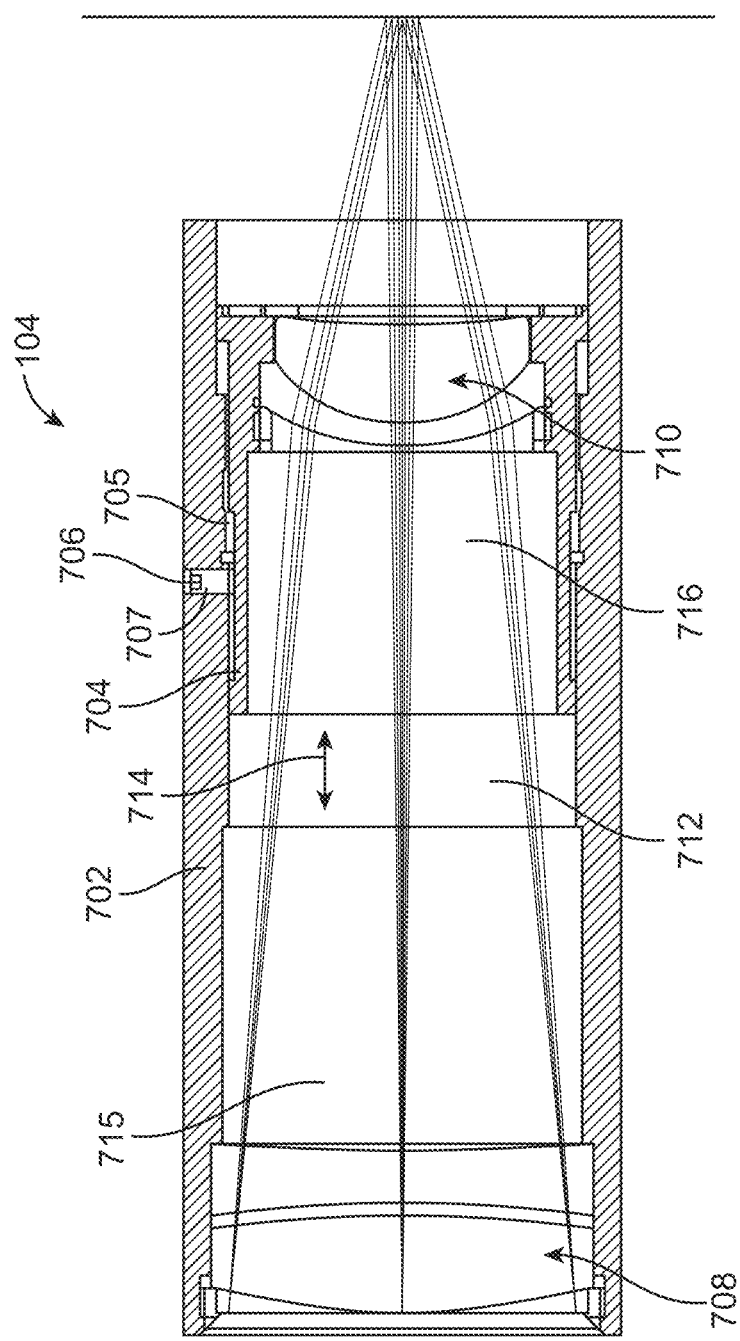
FIG. 7 illustrates a 70-75 mm focal length collimating lens provided in an intermediate position according to one example of the technology.

FIG. 7 illustrates the collimating lens 104 according to one example of the technology. According to one example, the collimating lens 104 may include a telescoping structure that includes an outer body 702 and an inner body 704. According to one example, the outer body 702 may be dimensioned to receive the inner body 704. For example, an inside diameter of the outer body 702 may be dimensioned to receive an outside diameter of the inner body 704. According to one example, the inside diameter of the outer body 702 may be slightly larger than the outside diameter of the inner body 704 to provide a tight fit while allowing the inner body 704 to slide or telescope within the outer body 702. According to one example, the bodies 702, 704 may be dimensioned to fit sufficiently tight while preventing flexing in an x-direction, y-direction, or z-direction. Furthermore, the outer body 702 and the inner body 704 may be substantially concentric when the inner body 704 is inserted into the outer body 702. The concentric aspect may facilitate aligning lenses provided within the outer body 702 and the inner body 704. One of ordinary skill in the art will readily appreciate that the outer body 702 and the inner body 704 may have other cross-sectional shapes such as rectangular, octagonal, or the like.

According to one example, a fastener 706 may be provided to fixedly secure the outer body 702 and the inner body 704. For example, the fastener 706 may fixedly secure the outer body 702 relative to the inner body 704. According to one example, the fastener 706 may include a screw, a pin, or the like. According to one example, the inner body 704 may include an elongated slot 705 and the outer body 702 may include a cavity 707. According to one example, the fastener 706 may be inserted into the cavity 707 provided in the outer body 702. According to one example, the cavity 707 may include threads for securing a screwing fastener. According to one example, the inner body 704 may slide into the outer body 702 and may be restricted to slide an amount that corresponds to a length of the elongated slot 705 provided in the inner body 704. Accordingly, an overall length of the collimating lens 104 varies as the inner body 704 slides into and out of the outer body 702.

According to one example, the fastener 706 may be fixedly secured or tightened to prevent the outer body 702 and the inner body 704 from sliding relative to each other. For example, the fastener 706 may be tightened after a desired focal length is achieved to lock a relative position of the outer body 702 and the inner body 704. For example, the fastener 706 may be a screwing fastener that is tightened into the cavity 707 to frictionally secure the outer body 702 and the inner body 704. According to one example, the fastener 706 may be removed or loosened to allow the outer body 702 and the inner body 704 to slide relative to each other. Generally, the focal length of the collimating lens 104 is maintained after being set and is not adjusted after a spectrometer is shipped from a manufacturer. However, there may be circumstances where it is desirable to provide uniform focal lengths to a group of spectrometers after they are shipped from a manufacturer. In this case, a qualified operator may adjust the focal lengths of a group of spectrometers selected for a specific study. In either case, the focal lengths of the group of spectrometers may remain fixed while the spectrometers are in use. One of ordinary skill in the art will readily appreciate that the fastener may include epoxy, a rivet, or other fastener that provides one-time use. One of ordinary skill in the art will readily appreciate that the telescoping structure may include additional fastening mechanisms that secure the outer body 702 and the inner body 704.

According to one example, the outer body 702 and the inner body 704 may be configured to receive one or more lenses. For example, an inside surface of the outer body 702 may be machined to define a cavity having dimensions that receive one or more lenses therein to form a first lens set 708. According to one example, an inside surface of the inner body 704 may be machined to dimensions that receive one or more lenses therein to form a second lens set 710. One of ordinary skill in the art will readily appreciate that the lenses may be directly secured to the outer body 702 or the inner body 704. Alternatively, the lenses may be indirectly secured to the outer body 702 or the inner body 704 using a separate structure.

According to one example, an adjustable single air gap 712 is defined between the first lens set 708 and the second lens set 710. According to one example, an arrow 714 is illustrated within the adjustable air gap 712 to indicate a direction the inner body 704 slides relative to the outer body 702. According to one example, a dimension of the air gap 712 may be adjusted by sliding the inner body 704 relative to the outer body 702. According to one example, the collimating lens 104 may include cavities 715,716. While not shown, the inner body 704 may be inserted into the outer body 702 to reduce the air gap 712. According to one example, the overall length of the collimating lens 104 is longer when the single air gap 712 is present and shorter when the single air gap 712 is eliminated. According to one example, the collimating lens 104 may have a focal length that varies in a range of 70-75 mm. One of ordinary skill in the art will readily appreciate that the collimating lens may have a focal length that varies over a different range.

According to one example, FIG. 8 illustrates a CCD image 800 with seven (7) bands 801a-801g that correspond in number to optical fibers provided in a probe 1002 coupled to the spectrometer 100. The light-colored vertical lines spaced along a length of each band 801a-801g correspond to frequency peaks of light guided down the optical fibers. For example, the light-colored vertical lines localized around pixel numbers 200, 300, 500, 600, and 750 in FIG. 8 substantially correspond to the frequency peaks localized around pixel numbers 200, 300, 500, 600, and 750 in FIG. 5. According to one example, the CCD image 800 is generated using a 50 mm focal length collimating lens that stretches the bands 801a-801g in the y-direction to substantially fill an area of the CCD display.

According to one example, FIG. 9 illustrates a CCD image 900 with seven (7) bands 901a-901g that correspond in number to optical fibers provided in a probe 1002 coupled to the spectrometer 100. According to one example, the CCD image 900 is generated using a 72 mm focal length collimating lens that compresses the bands 901a-901g in the y-direction to occupy less area of the CCD display. The light-colored vertical lines spaced along a length of each band 901a-901g correspond to frequency peaks of light guided down the optical fibers. For example, the light-colored vertical lines localized around pixel numbers 200, 300, 500, 600, and 750 in FIG. 9 substantially correspond to the frequency peaks localized around pixel numbers 200, 300, 500, 600, and 750 in FIG. 5. Based on a comparison of the CCD images illustrated in FIGS. 8 and 9, a collimating lens having a shorter focal length compared to a focal length of a focus lens generates an image with a larger height in the y-direction as compared to a collimating lens having a longer focal length.

According to one example, a focal length ratio of the focus lens 110 to the collimating lens 104 determines a height in the y-dimension that a CCD image is illuminated on the detector 112. For example, a height in the y-dimension illuminated on the detector 112 will be shorter if the focal lengths of the focus lens 110 and the collimating lens 104 are equal. In contrast, a height in the y-dimension illuminated on the detector 112 will be taller if the focal length of the collimating lens 104 is smaller than the focal length of the focus lens 110. The technology provides a linear relationship between the illuminated height in the y-dimension and a ratio of the focal lengths of the focus lens 110 and the collimating lens 104. The technology changes a focal length of the collimating lens 104 to modify the CCD image in the y-dimension while maintaining the CCD image in the x-dimension. For example, a collimating lens 104 having a shorter focal length compared to a focal length of a focus lens generates a CCD image with a larger height in the y-dimension. In this way, shortening a focal length of the collimating lens 104 may maximize a height of a CCD image projected onto a detector 112. According to one example, the technology allows for changes to the dimensions of the detector 112 after the spectrometer 100 is constructed.

According to one example, the technology allows the focal lengths of the focus lens 110 and the collimating lens 104 to be adjusted independently to maximize an area the CCD image is projected onto the detector 112. Furthermore, having adjustable focal lengths for both the focus lens 110 and the collimating lens 104 allows for the manufacture of two or more spectrometers having a substantially equal illumination footprint size on the detector 112. According to one example, providing adjustable focal lengths for both the focus lens 110 and the collimating lens 104 enhances performance of mathematical algorithms that do not need to compensate for variations in lens focal lengths.

In contrast, conventional spectrometers employ a focus lens and a collimating lens having fixed or non-adjustable focal lengths that require mathematical algorithms to compensate for variations in lens focal lengths. Furthermore, conventional spectrometers do not maximize an area the CCD image is projected onto a detector nor provide a substantially equal illumination footprint size for two or more spectrometers. Accordingly, conventional spectrometers may suffer information loss when an area of the CCD image is larger than an area of the detector and may not obtain uniform results for a same test specimen when the illumination footprint size is different. Conventional spectrometers may suffer from other drawbacks.

Figure 10:
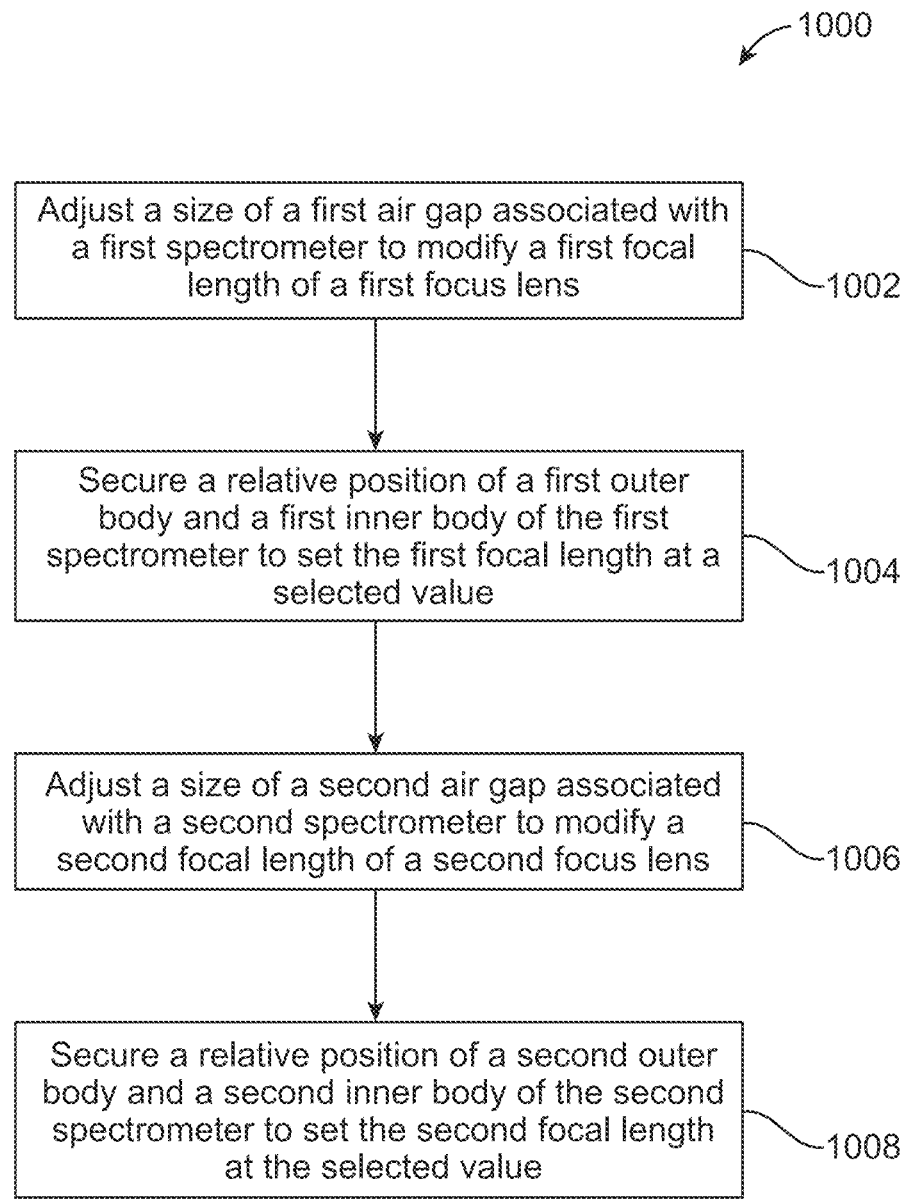
FIG. 10 illustrates a flowchart of an example method of providing a uniform focal length to two spectrometers according to one example of the technology.

FIG. 10 illustrates a method 1000 of providing a uniform focal length to two spectrometers according to one example. According to one example, the spectrometers include a focus lens with an outer body having a first lens set, an inner body having a second lens set, and an air gap defined between the first lens set and the second lens set. The inner body is moveable relative to the outer body to adjust a size of the air gap in order to modify a focal length of the focus lens. In operation 1002, a size of a first air gap associated with a first spectrometer is adjusted in order to modify a first focal length of the first focus lens. In operation 1004, a relative position of a first outer body and a first inner body of the first spectrometer is secured to set the first focal length at a selected value. In operation 1006, a size of a second air gap associated with a second spectrometer is adjusted in order to modify a second focal length of the second focus lens. In operation 1008, a relative position of a second outer body and a second inner body of the second spectrometer are secured to set the second focal length at the selected value. According to one example, the first focal length and the second focal length are set to the same selected value.

This description presents block diagrams and operational illustrations of methods of creating a plurality of spectrometers having similar characteristics such as substantially similar focal lengths. It is understood that each block of the block diagrams or operational illustrations, and combinations of blocks in the block diagrams or operational illustrations, may be implemented with analog or digital hardware and computer program instructions. The computer program instructions may be provided to a processor that executes the computer program instructions to implement the functions/acts specified in the block diagrams or operational block or blocks. In some alternative implementations, the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved.

Figure 11:
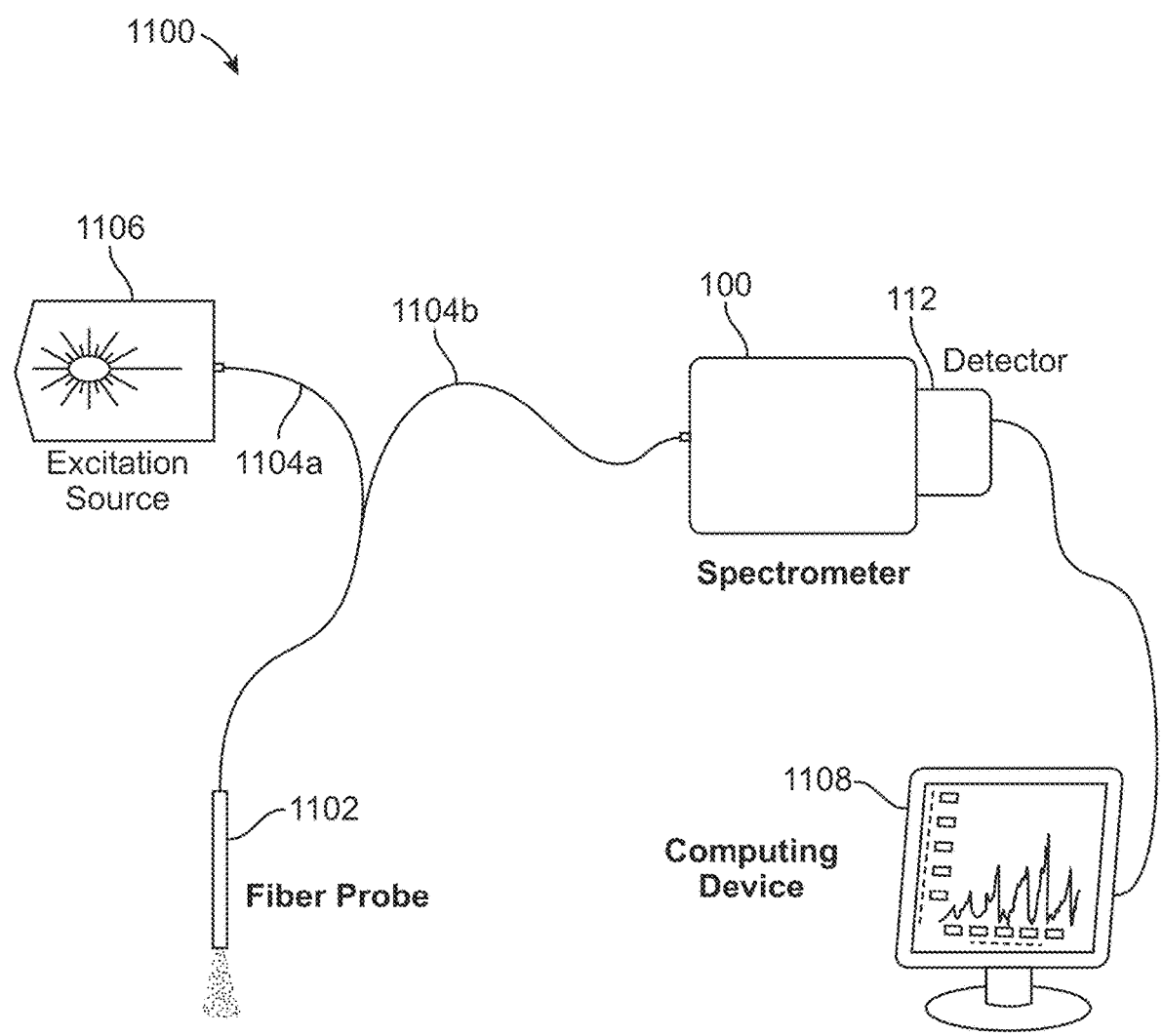
FIG. 11 illustrates a spectroscopy system according to one example of the technology.

FIG. 11 illustrates a spectroscopy system 1100 according to one example of the technology. The spectroscopy system 1100 may include a spectrometer 100, a probe 1102, a fiber optic probe assembly 1104a-b, an excitation source 1106, a detector 112, and a computing device 1108, among other components. The spectrometer 100 may include a Raman spectrometer as described herein. One of ordinary skill in the art will readily appreciate that other types of spectrometers may be employed. According to one example, the fiber optic probe assembly 1104a-b is optically coupled to a probe 1102 that illuminates a substance and guides collected light rays into the spectrometer 100. According to one example, a first end of the fiber optic probe assembly 1104a is coupled to the excitation source 1106 and a second end of the fiber optic probe assembly 1104a is coupled to the probe 1102 that illuminates the substance. A first end of the fiber optic probe assembly 1104b is coupled to the probe 1102 to collect light rays and a second end of the fiber optic probe assembly 1104b is coupled to the spectrometer 100. According to one example, the excitation source 1106 may include a narrow-wavelength energy source such as a monochromatic or laser light.

According to one example, the spectroscopy system 1100 includes a detector 112 and a computing device 1108. According to one example, the computing device 1008 may include a server, computer workstation, desktop, notebook, laptop, handheld computer, or the like. The computing device 1108 may employ any of a number of computer operating systems known to those skilled in the art and may include instructions executable by one or more computing devices. The computer-executable instructions may be compiled or interpreted from computer programs created using a variety of known programming languages and/or technologies. The computing device 1108 may include a processor or microprocessor that receives instructions such as from a memory, a computer-readable medium, or the like. The processor executes these instructions to perform one or more processes, including one or more processes described herein. Such instructions and other data may be stored and transmitted using a variety of known computer-readable media.

According to one example, a computer-readable medium may include any medium that participates in providing data or instructions that may be read by a computer. Such a medium may take many forms including volatile media, non-volatile media, or the like. According to one example, non-volatile media may include persistent memory or the like. According to one example, volatile media may include dynamic random access memory (DRAM) or the like that typically constitutes a main memory. Common forms of computer-readable media may include magnetic medium, optical medium, physical medium, memory chips, a carrier wave, or any other medium from which a computer can read.

According to one example, databases or data stores may include mechanisms for storing, accessing, and retrieving data, including a hierarchical database, a set of files in a file system, an application database in a proprietary format, a relational database management system (RDBMS), or the like. The databases or data stores are accessible locally or via a network by the computing device 1108 having an operating system. A file system may be accessible via the operating system and may include files stored in various formats. An RDBMS generally employs the known Structured Query Language (SQL) in addition to a language for creating, storing, editing, and executing stored procedures.

Returning to FIG. 11, the detector 112 is communicatively coupled to the computing device 1108. According to one example, the detector 112 converts optical signals received from the focus lens 110 into digital signals that are communicatively coupled to the computing device 1108. According to one example, the computing device 1108 may include a display with a graphical user interface ("GUI") that renders images associated with image data received from the detector 112. According to one example, the image data may be stored in a database. For example, the image data may be stored locally at a database associated with the computing device 1108.

Figure 12:
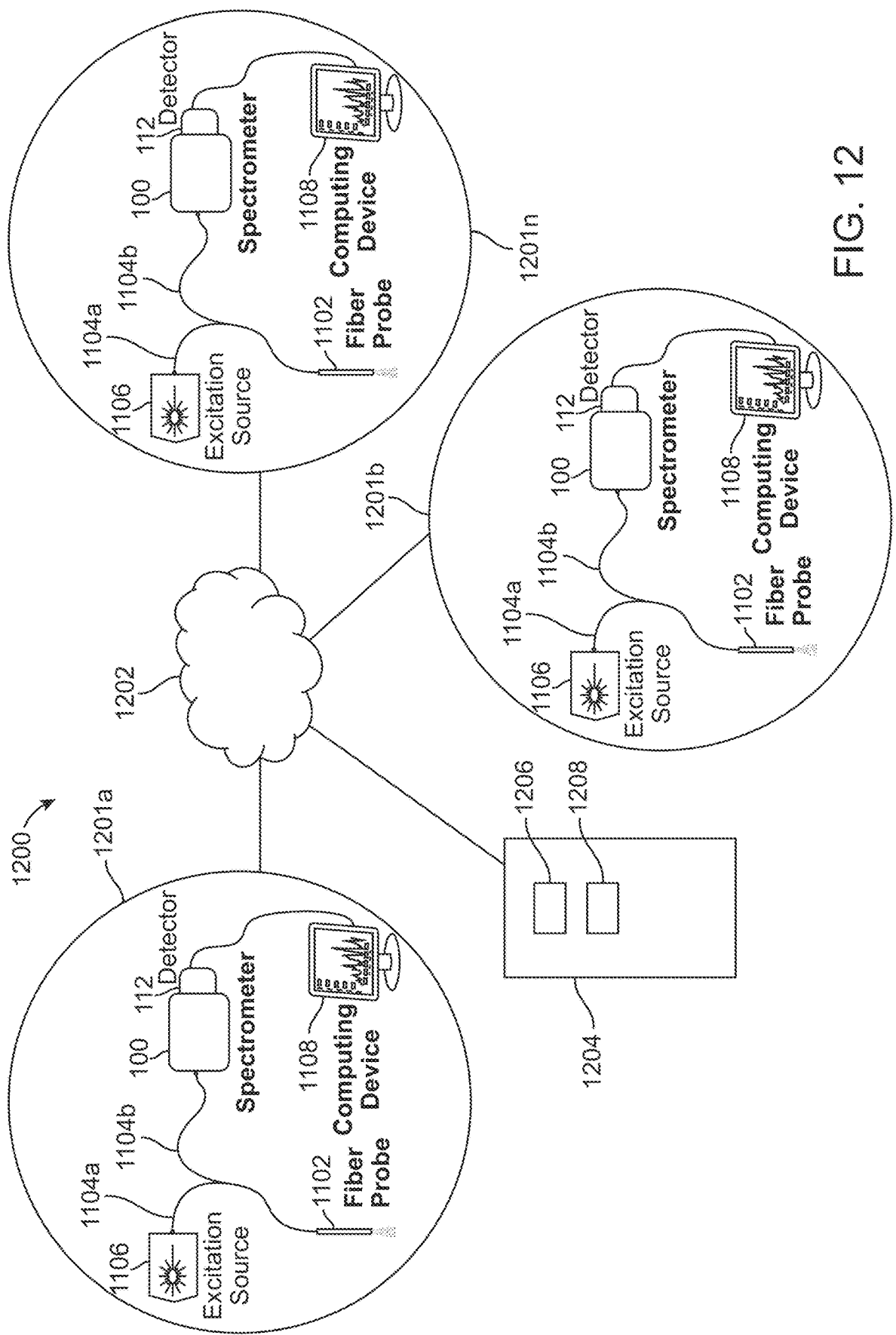
FIG. 12 illustrates a spectroscopy system according to another example of the technology.

FIG. 12 illustrates a spectrometer network 1200 according to one example. The spectrometer network 1200 may include a plurality of spectroscopy systems 1201a-1201n that are coupled together via a communications network 1202. According to one example, each spectroscopy system 1201a-1201n may include components illustrated and described with reference to FIG. 11. According to one example, selected ones of the plurality of spectroscopy systems 1201a-1201n may be associated with each other. For example, selected ones of the plurality of spectroscopy systems 1201a-1201n may be associated with each other to allow data sharing among associated spectroscopy systems 1201a-1201n.

According to one example, a plurality of the spectroscopy systems 1201a-1201n may be associated based on having substantially similar spectrometer characteristics, being substantially similar spectrometer types, or based on other common features. According to one example, the spectroscopy systems 1201a-1201n may be located in different geographic areas. For example, the plurality of spectroscopy systems 1201a-1201n may be located at different medical facilities situated in different regions or countries. Alternatively, the spectroscopy systems 1201a-1201n may be located in a same geographic area such as in a same medical facility.

According to one example, a plurality of the spectroscopy systems 1201a-1201n may be associated with each other based on having substantially similar spectrometer characteristics such as substantially similar focal lengths, substantially similar slit widths, and substantially similar excitation laser wavelengths, among other spectrometer characteristics. One of ordinary skill in the art will readily appreciate that modifying one spectrometer characteristic may cause the corresponding spectroscopy system 1201a-1201n to be disassociated from a previous association. For example, modifying a slit width of a spectrometer may cause the spectrometer to produce a different spectral result as compared to the spectral result produced before the slit width was modified. In this case, the corresponding spectroscopy system 1201a-1201n may be associated with a different group of spectroscopy systems 1201a-1201n that share common features. According to one example, the spectroscopy systems 1201a-1201n may be associated with other substantially similar spectroscopy systems 1201a-1201n in substantially real-time based upon detecting substantially similar spectrometer characteristics. Alternatively, spectroscopy systems 1201a-1201n may be disassociated from other spectroscopy systems 1201a-1201n in substantially real-time based upon detecting different spectrometer characteristics. In this way, selected groupings of spectroscopy systems 1201a-1201n may be dynamic and may be based upon real-time detection of spectrometer characteristics.

According to one example, the spectrometer network 1200 may include an application server 1204 having an onboard computer or processor 1206 that is communicatively coupled to a computer readable media 1208 that stores data in a database or the like. According to one example, the application server 1204 allows the plurality of spectroscopy systems 1201a-1201n to store data to and retrieve data from the computer readable media 1208 via the communications network 1202. According to one example, the application server 1204 may store spectrometer characteristics corresponding to each of the plurality of spectroscopy systems 1201a-1201n. According to one example, the application server 1204 may be updated when spectrometer characteristics are modified for the plurality of spectroscopy systems 1201a-1201n. For example, the computer readable media 1208 may be modified to track spectrometer characteristics for the plurality of spectroscopy systems 1201a-1201n. According to one example, the application server 1204 may propose associations and disassociations for the plurality of spectroscopy systems 1201a-1201n based on analyzing the spectrometer characteristics.

According to one example, the computer readable media 1208 provides a centralized database that may be accessed by the plurality of spectroscopy systems 1201a-1201n. According to one example, the application server 1204 may include software that allows data sharing among the plurality of spectroscopy systems 1201a-1201n. According to one example, data associated with spectral images received from the plurality of spectroscopy systems 1201a-1201n may be stored remotely at the computer readable media 1208. Additionally, or alternatively, data associated with spectral images received from the plurality of spectroscopy systems 1201a-1201n may be stored locally at corresponding spectroscopy systems 1201a-1201n.

According to one example, the communications network 1202 may support a TCP/IP connection, for example, via the Internet, a cellular communications network, a private WAN, a PLC network, or any other suitable communications technology. According to one example, the communications network 1202 may be connected to the Internet via conventional routers and/or firewalls. According to one example, the communications network 1102 may be connected to a common carrier wireless network such as a CDMA network. According to one example, the communications network 1202 may be connected to a wide area network that is connected to the PLC network.

According to one example, the technology described herein may be employed in the medical field to improve research studies. For example, the technology may be employed to facilitate data sharing among two or more spectroscopy systems 1201a-1201n. According to one example, the spectroscopy systems 1201a-1201n may generate Raman spectra during medical procedures. For example, a medical professional or surgeon may be tasked with identifying tissue types during a medical procedure. For example, the tissue types may include healthy tissue and diseased tissue. According to one example, diseased tissue such as a cancer tumor may be located and marked prior to the medical procedure. For example, imaging devices such as computed tomography ("CT") devices or magnetic resonance imaging ("MRI") devices may be employed prior to a medical procedure in order to mark diseased tissue.

Typically, the healthy tissue and diseased tissue appear visually similar to the naked eye but are visually distinguishable when viewed through the imaging device. According to one example, the imaging device is employed to embed a marker within the diseased tissue. During a medical procedure, a surgeon may rely on the embedded marker as a reference point to identify a location and size of the diseased tissue. Medical protocols typically require removal of "margin" tissue that includes healthy tissue proximate to the diseased tissue.

During the medical procedure, the diseased tissue and the margin tissue are biopsied and placed on glass slides with a corresponding label for subsequent examination by a pathologist. The pathologist analyzes the tissue samples and confirms the glass slides are correctly labeled. For example, the pathologist may analyze the various tissue sample and confirm the corresponding slides are correctly labeled as "diseased tissue" or "margin tissue." If, for example, the margin tissue includes diseased cells, medical protocol may require the surgeon to perform a second operation to remove additional tissue until an appropriate margin tissue is obtained.

According to one example, the surgeon may employ a spectroscopy system 1201a-1201n during the medical procedure as follows. According to one example, the surgeon may insert the probe 1102 to the embedded marker and capture a Raman spectrum of the suspected diseased tissue located proximate the embedded marker. The Raman spectrum may be associated with the corresponding slide. This process of capturing a Raman spectrum and associating it with the corresponding slide may be repeated for each slide produced. Upon receiving a pathologist report that identifies a tissue type for each slide, an operator may access the Raman spectra corresponding to the slides and may add or update data fields to manually identify the Raman spectra in accordance with the pathologist report. Accordingly, the technology allows an operator to categorize the Raman spectra in accordance with the pathologist report.

According to one example, the Raman spectra and corresponding data fields obtained from the spectroscopy systems 1201a-1201n may be electronically transmitted to the computer readable media 1208 for storage and subsequent retrieval. Additionally, or alternatively, the Raman spectra and corresponding data fields may be stored locally at a database associated with the computing device 1108. According to one example, the above described medical procedures and corresponding capture of Raman spectra may be performed at different facilities around the world. Nonetheless, the Raman spectra captures may be electronically transmitted and stored in a centralized location at the computer readable media 1208 for subsequent retrieval.

According to one example, the spectrometer network 1200 provides automated identification of tissue types during surgery. For example, when the surgeon inserts the probe 1102 to the embedded marker and captures a Raman spectrum of the suspected diseased tissue located proximate the embedded marker, the application server 1204 may compare the Raman spectrum against the stored Raman spectra to identify a match. Upon identifying a match, the corresponding spectroscopy system 1201a-1201n may provide an alert that identifies the Raman spectrum as corresponding to diseased tissue or healthy/margin tissue. In this way, the surgeon may be provided with real-time identification of tissue type during surgery. To the extent the spectrometer network 1200 does not reveal a match, this may indicate that the tissue type is a rare tissue type that has not yet been biopsied.

According to one example, the spectrometer network 1200 takes advantage of the plurality of the spectroscopy systems 1201a-1201n having substantially similar spectrometer characteristics to capture Raman spectra for all biopsies processed with the spectroscopy systems 1201a-1201n. This allows the spectrometer network 1200 to increase the number of Raman spectra available for matching against. Alternatively, if each spectroscopy system 1201a-1201n had a spectrometer with different spectrometer characteristics, then each spectroscopy system 1201a-1201n would be limited to matching against Raman spectra stored on its own system. Under this condition, a Raman spectrum corresponding to a rare tissue type may not be captured on its own system. In contrast, by employing all spectroscopy systems 1201a-1201n having substantially similar spectrometers, the technology increases the number of Raman spectra available for matching to those captured by all the spectroscopy systems 1201a-1201n.

According to one example, the descriptions provided herein may be used for any spectrometers. Additionally, while the examples provided herein are directed to the medical field, one of ordinary skill in the art will readily appreciate that this technology may be used with any fields or applications that employ chemical analysis. Examples are described above with the aid of functional building blocks that illustrate the implementation of specified operations and relationships thereof. The boundaries of these functional building blocks have been arbitrarily defined herein for the convenience of the description. Alternate boundaries can be defined so long as the specified functions and relationships thereof are appropriately performed. While the foregoing illustrates and describes examples of this technology, it is to be understood that the technology is not limited to the constructions disclosed herein. The technology may be embodied in other specific forms without departing from its spirit. Accordingly, the appended claims are not limited by specific examples described herein.

What is claimed is:

1. A method of providing two spectrometers with substantially uniform focal lengths, each spectrometer having a corresponding lens with a first body that includes a first lens set, a second body that includes a second lens set, and an air gap defined between the first lens set and the second lens set, the first and second bodies being moveable relative to each other to adjust a size of the air gap in order to modify a focal length of the corresponding lens, the method comprising:
   obtaining a focal length value;
   adjusting, in a first spectrometer, a size of a first air gap for a first lens to set a first focal length value substantially equal to the focal length value;
   securing a relative position of the first body and the second body of the first lens;
   adjusting, in a second spectrometer, a size of a second air gap for a second lens to set a second focal length value substantially equal to the focal length value; and
   securing a relative position of the first body and the second body of the second lens, wherein the first and second spectrometers have substantially equal first and second focal length values, respectively, to generate substantially similar spectra when testing a same specimen.

2. The method according to claim 1, wherein the first focal length value and the second focal length value are selected to render the first focal length substantially equal to the second focal length.

3. The method according to claim 1, further comprising adjusting the size of the first air gap and the size of the second air gap to obtain substantially equal illumination footprint sizes for the first and second spectrometers in at least one of an x-dimension and a y-dimension.

4. The method according to claim 1, further comprising adjusting the size of the first air gap associated with the first spectrometer and the size of the second air gap associated with the second spectrometer to obtain substantially equal illumination footprint sizes for the first and second spectrometers.

5. The method according to claim 1, wherein moving the first and second bodies of the corresponding lenses relative to each other changes a spectral image size in an x-dimension.

6. The method according to claim 1, wherein moving the first and second bodies of the corresponding lenses relative to each other changes a spectral image size in a y-dimension.

7. The method according to claim 1, wherein moving the first and second bodies of the corresponding lenses relative to each other stretches or compresses a spectral image in an x-dimension.

8. The method according to claim 1, wherein moving the first and second bodies of the corresponding lenses relative to each other reveals a relationship between a height of the spectral image in a y-dimension and a ratio of focal length values for the corresponding focus lens and a collimating lens optically coupled thereto.

9. The method according to claim 1, further comprising unsecuring the relative positions of at least one of the corresponding first and second bodies associated with the first and second lenses to modify the corresponding one of the first focal length value and the second focal length value.

10. A spectrometer, comprising:
    a focus lens:
      a first body that includes a first lens set;
      a second body that includes a second lens set;
      an air gap defined between the first lens set and the second lens set, the first and second bodies being moveable relative to each other to adjust a size of the air gap in order to modify a size of a spectral image in a first dimension according to a first amount and in a second dimension according to a second amount, the first amount being different than the second amount; and a fastener that mechanically engages the first body and the second body to prevent relative motion therebetween, the fastener being mechanically disengaged to permit relative motion between the first body and the second body; and a detector optically coupled to the focus lens, wherein the detector converts optical signals into electrical signals to render spectral data, dimensions of the spectral data being modified based on the size of the spectral image and wherein the size of the air gap is adjusted to set a focal length value substantially equal to a selected focal length value.

11. The spectrometer according to claim 10, further comprising a slit provided at an input connector, the slit being dimensioned to define a resolution for the spectrometer.

12. The spectrometer according to claim 10, wherein the selected focal length value is obtained from a second spectrometer.

13. The spectrometer according to claim 10, wherein the first and second bodies are moved relative to each other to set the focal length value substantially equal to the selected focal length value.

14. The spectrometer according to claim 10, wherein the first and second bodies are moved relative to each other to stretch or compress the spectral image in an x-dimension.

15. The spectrometer according to claim 10, wherein the fastener includes a screw, a pin, epoxy, a rivet, or any combination thereof.

16. The spectrometer according to claim 10, wherein the first and second bodies are moved relative to each other to modify dimensions of the spectral data.

17. The spectrometer according to claim 10, wherein the first and second bodies are moved relative to each other to change an image size in a y-dimension.

18. The spectrometer according to claim 10, wherein the first and second bodies are moved relative to each other to change an image size in an x-dimension.

19. The spectrometer according to claim 10, wherein the first and second bodies are moved relative to each other to set the focal length value substantially equal to a second selected focal length value.

20. The spectrometer according to claim 10, wherein the first and second bodies are moved relative to each other to set the focal length value substantially equal to a third selected focal length value.

21. A method of providing two spectrometers with substantially similar spectral results when testing a same specimen, each spectrometer having a corresponding lens with a first body that includes a first lens set, a second body that includes a second lens set, and an air gap defined between the first lens set and the second lens set, the first and second bodies being moveable relative to each other to adjust a size of the air gap in order to modify a focal length of the corresponding lens, the method comprising:

generating a first spectra for the specimen using a first spectrometer having a first lens that adjusts to stretch or compress the first spectra in a first dimension;

generating a second spectra for the specimen using a second spectrometer having a second lens that stretches or compresses the second spectra in the first dimension;

adjusting the size of the air gap for the second lens to stretch or compress the second spectra to substantially match the first spectra; and securing a relative position of the first body and the second body of the second lens to maintain the substantial match between the first spectra and the second spectra.

22. The method of claim 21, wherein the first dimension is an x-dimension and wherein adjusting the size of the air gap for the second lens includes stretching or compressing the second spectra in the x-dimension.

23. The method of claim 21, wherein the first dimension is a y-dimension and wherein adjusting the size of the air gap for the second lens includes stretching or compressing the second spectra in the y-dimension.

24. The method of claim 21, wherein adjusting the size of the air gap for the second lens includes stretching or compressing the second spectra in a first dimension according to a first amount and in a second dimension according to a second amount, the first amount being different than the second amount.

25. The method of claim 21, further comprising:
overlaying the first spectra and the second spectra; and
adjusting the size of the air gap for the second lens to stretch or compress the second spectra to substantially match the first spectra.

26. The method of claim 25, wherein the second spectra substantially matches the first spectra when peaks in the second spectra substantially align with corresponding peaks in the first spectra.

27. A method of providing two spectrometers with substantially similar image results when testing a same specimen, each spectrometer having a corresponding lens with a first body that includes a first lens set, a second body that includes a second lens set, and an air gap defined between the first lens set and the second lens set, the first and second bodies being moveable relative to each other to adjust a size of the air gap in order to modify a focal length of the corresponding lens, the method comprising:

generating a first image for the specimen using a first spectrometer having a first lens that adjusts to stretch or compress the first image in a first dimension;

generating a second image for the specimen using a second spectrometer having a second lens that stretches or compresses the second image in the first dimension;

adjusting the size of the air gap for the second lens to stretch or compress the second image to substantially match the first image; and securing a relative position of the first body and the second body of the second lens to maintain the substantial match between the first image and the second image.

28. The method of claim 27, wherein the first dimension is an x-dimension and wherein adjusting the size of the air gap for the second lens includes stretching or compressing the second image in the x-dimension.

29. The method of claim 27, wherein the first dimension is a y-dimension and wherein adjusting the size of the air gap for the second lens includes stretching or compressing the second image in the y-dimension.

30. The method of claim 27, wherein the second image substantially matches the first image when bands in the second image substantially align with corresponding bands in the first image.

* * * * *